United States Patent [19]

Planeta

[11] Patent Number: 4,728,277

[45] Date of Patent: Mar. 1, 1988

[54] FILM-HANDLING DEVICES FOR THIN FLEXIBLE FILMS

[76] Inventor: Mirek Planeta, 228 McCraney St. W., Oakville, Ontario, Canada, L6H 1H7

[21] Appl. No.: 947,778

[22] Filed: Dec. 30, 1986

[51] Int. Cl.[4] .................. B29C 53/18; B29C 53/20
[52] U.S. Cl. .................. 425/72.1; 239/523;
 239/DIG. 7; 264/569; 425/72 S; 425/326.1;
 425/327; 425/387.1
[58] Field of Search .............. 425/72 R, 72 S, 325,
 425/327, 326.1, 387.1, 394; 264/564, 566, 569;
 239/521, 523, 524, DIG. 7, 522

[56] References Cited

U.S. PATENT DOCUMENTS

| | | | |
|---|---|---|---|
| 3,568,252 | 3/1971 | Masuda et al. | 425/72 R |
| 3,621,531 | 11/1971 | Feltgen et al. | 425/72 S |
| 3,668,288 | 6/1972 | Takahashi | 425/72 R X |
| 3,834,847 | 9/1974 | Fletcher | 425/72 S |
| 3,888,609 | 6/1975 | Saint Eve et al. | 425/72 R |
| 4,118,453 | 10/1978 | Herrington | 425/72 R X |
| 4,330,501 | 5/1982 | Jones et al. | 425/72 R |
| 4,388,061 | 6/1983 | Bebok | 264/566 X |
| 4,434,129 | 2/1984 | Bose | 425/72 R |
| 4,447,387 | 5/1984 | Blakeslee, III et al. | 425/72 R |
| 4,472,343 | 9/1984 | Kawamura et al. | 264/566 X |
| 4,478,564 | 10/1984 | Shinmoto | 425/72 R |
| 4,479,766 | 10/1984 | Planeta | 264/569 X |
| 4,505,657 | 3/1985 | Ikeya | 425/72 R |
| 4,533,309 | 8/1985 | Planeta | 425/387.1 X |
| 4,634,054 | 1/1987 | Grusha | 239/522 X |

FOREIGN PATENT DOCUMENTS

| | | | |
|---|---|---|---|
| 59-7019 | 1/1984 | Japan | 425/72 R |
| 426853 | 5/1974 | U.S.S.R. | 425/72 R |

Primary Examiner—Richard L. Chiesa
Attorney, Agent, or Firm—Rogers & Scott

[57] ABSTRACT

The invention provides an air operated film-handling or stabilizing device that can be used with most thin flexible films or webs, such as plastics, paper, thin metal, etc. The configuration of the device depends upon the shape of the sheet and, for example, is flat for flat sheets and ring-shaped for use in blown plastics film production to surround the blown bubble. The device provides two opposite orifices which discharge respective streams of air in opposite directions over respective surfaces which are parallel to the face of the film to be handled and/or stabilized. A third surface is disposed between the two orifices also parallel to the film face, but spaced further from it than the two first-mentioned faces, resulting in a zone of lower air pressure that urges the film toward the third surface, but without the possibility of touching it, or the other two surfaces, so that the film is held by the force in a stable location relative to the device. In developments the air streams may be heated or cooled, and additional air streams may be provided for additional cooling. Since the film is engaged only by air streams, it can be used with newly extruded materials while they are still molten or semi-molten, as well as with solid materials. The device may also be used, for example, as the film engaging part of a bubble sizing cage or collapsing frame.

18 Claims, 9 Drawing Figures

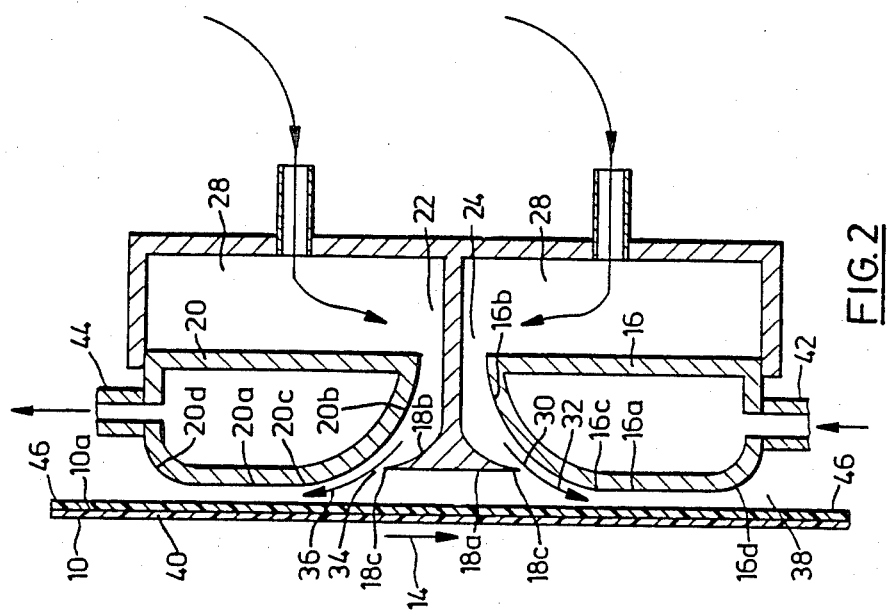
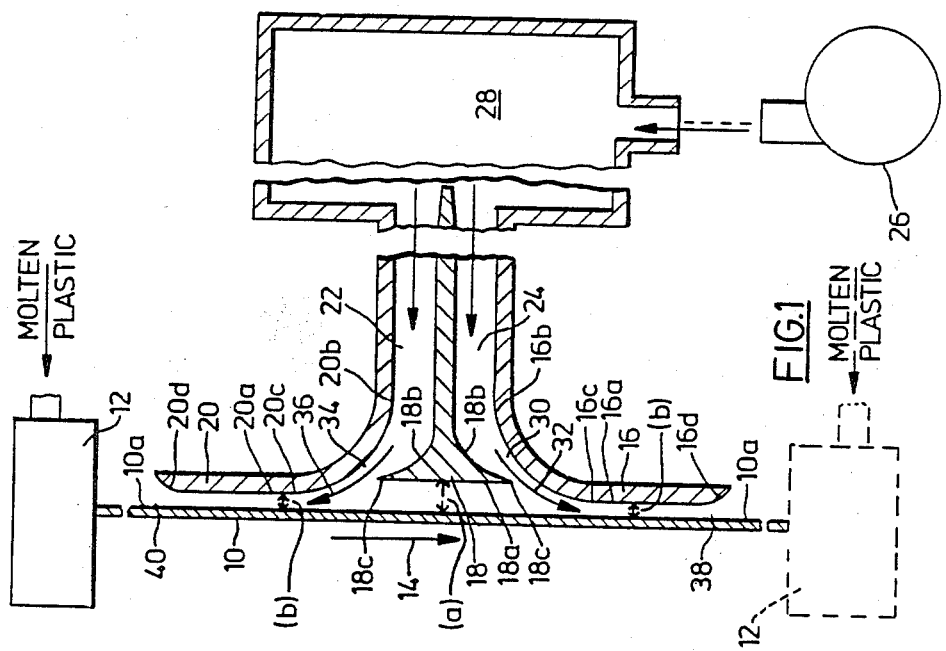

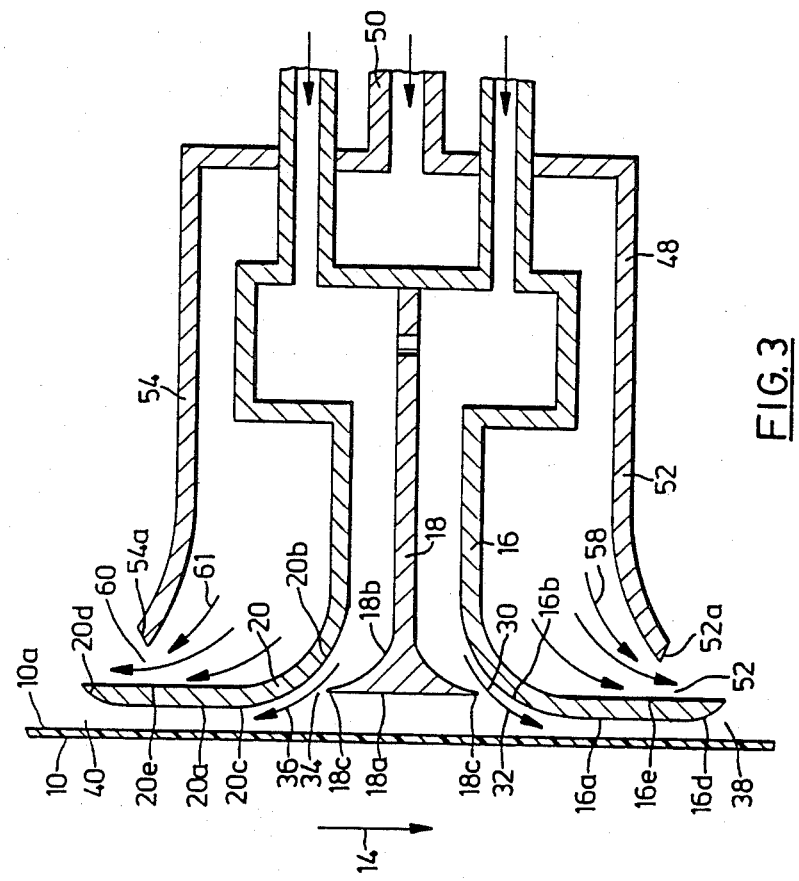

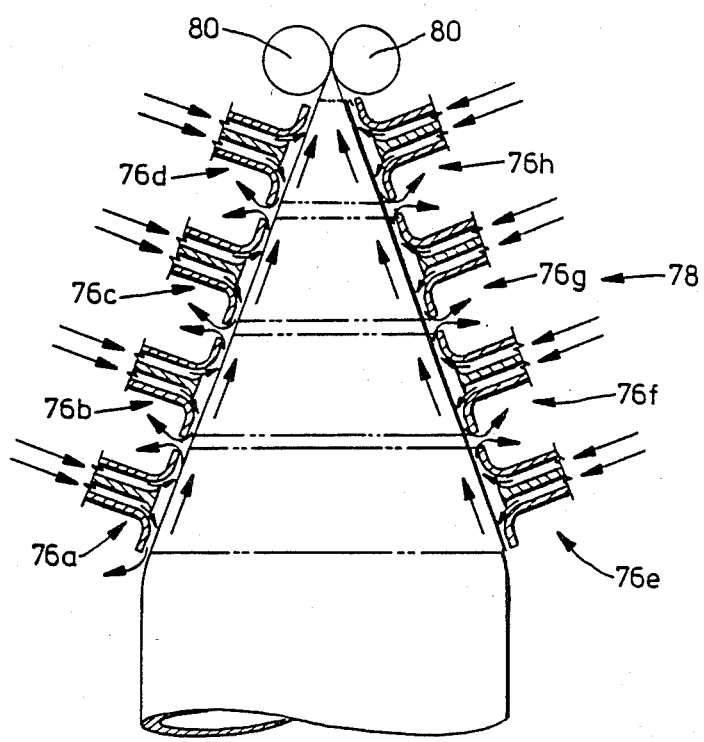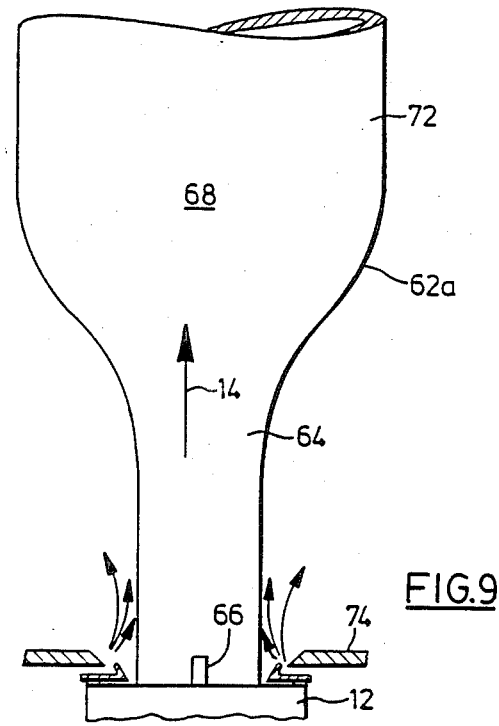
FIG.9

FILM-HANDLING DEVICES FOR THIN FLEXIBLE FILMS

FIELD OF THE INVENTION

This invention relates to a new form of film-handling device for use in processes involving thin flexible films such as films of plastics material, and especially to a new form of stabilizing device for use with the extruded, blown thin-walled tubes that are an intermediate stage in the production of plastic films, bags and the like.

REVIEW OF THE PRIOR ART

A number of industrial processes involve the handling of thin flexible films. One family of such processes is employed in the production of thin plastic films, plastic bags and the like, which is now a mature industry. In a typical process of this family, molten plastic material is extruded through a gap in a die in the form of a thin continuous sheet or tube, which is moved vertically upward or downward until it has cooled sufficiently for further handling; in the case of a tube, this handling usually involves collapsing the tube between a pair of rolls to a flattened double-wall web at a stage in the cooling at which the wall surfaces will not adhere to one another. Thereafter the film or flattened tube is wound onto a storage roll, or processed directly into the finished product. When the film is extruded as a flat sheet, it is usually formed at its desired final thickness, and this may also be the case when it is extruded as a tube, but more usually with the latter pressurized air is fed to the interior of the "bubble" formed by the tube, which blows it to a greatly increased diameter and correspondingly reduced wall thickness. The part of the bubble from the die to the frost line is sometimes referred to as the "stalk" and its length depends principally upon the physical characteristics of the plastic material, its speed of travel, and the rate at which it can be cooled during its travel.

For example, there is a growing tendency in the industry to employ resins of higher density than hitherto, and these high density materials require a longer stalk than the lower density resins which they replace, this longer stalk causing difficulties in handling and bubble stability. There is also a constant endeavour to maximize the output of an extruder, resulting in an increase in the speed of travel of the material out of the die and a corresponding increase in stalk length. These effects can be mitigated by increasing the cooling, usually by the application of cooling air to the exterior surface or surfaces, and sometimes also in the case of the bubble by cooling the pressurized air that is fed to its interior. For convenience in description hereinafter reference will be made principally to a film bubble, and the corresponding application to film sheets will be apparent to those skilled in the art. Cooling air is usually supplied to the exterior surface of a bubble by one or more cooling rings, each of which discharges one or more annular streams of cooling air for heat exchange engagement with the bubble exterior surface; a usual arrangement is to employ a primary ring in the immediate neighbourhood of the die orifice, and a more powerful secondary ring spaced along the path of the bubble at a location at which the melt, while still not solidified, has cooled sufficiently to withstand the force of the more powerful secondary ring air stream or streams.

A particular form of such ring which has achieved wide acceptance in the industry is known as a dual-orifice ring, and as its name implies, employs two closely spaced annular orifices, the first of which (i.e. the upstream orifice) directs an annular stream of smaller volume toward the tube and in its direction of movement through the ring. The second downstream orifice directs an annular stream of much larger volume in a direction somewhat away from the tube in its direction of movement, so as to create a venturi vacuum effect that urges the tube outwards toward the ring structure. The air flowing from the first orifice passes between the ring structure and the tube outer wall and prevents physical contact between them that would damage the tube surface and/or destroy the bubble. Such a ring therefore also provides stabilization for the bubble, as well as cooling, by holding the adjacent part of the bubble close to the stationary ring structure. These rings and their accompanying equipment are relatively expensive, and if employed too far away from the frost line they give little or no improvement in stability.

Despite the effective cooling obtained with the air rings currently employed, with many materials and at the speeds now desired, the stalk frequently becomes so long as to become difficult to keep stable, even with highly experienced operators, the bubble and the stalk usually swaying or oscillating away from the desired vertical longitudinal axis. One cause of such instability is extraneous air currents around the extrusion apparatus which, under industrial conditions, are difficult to prevent. If the sways or oscillations become too large, the gauge and surface finish of the resulting film will be adversely affected, and they may become sufficiently violent for complete disruption to take place. One solution would be to provide one or more stabilizing guides along the length of the bubble that will restrain it, but the provision of such devices is difficult owing to the fragile nature of the film while it is still in the molten or semi-molten state.

Another problem encountered in current commercial practice is that the air delivered to the film surface (e.g. from a primary cooling air ring) tends to stay with the surface in its travel, becoming progressively hotter and less effective as a cooling heat transfer medium, and yet at the same time shielding the surface from any subsequent cooling air flow that is directed at it. One solution to this problem has been to provide a mechanical iris or ring which surrounds the tube sufficiently closely that it will "strip" the layer of heated air from the film surface and thereby permit access of the fresh cooling air stream. The spacing between the ring and the film surface must be close for it to be effective (e.g. typically 1 to 20 mm), but with such close spacing any substantial instability in the bubble will result in mechanical contact that will damage the film or destroy the bubble.

DEFINITION OF THE INVENTION

It is therefore a principal object of the present invention to provide a new form of film-handling device for stabilizing the movement of thin flexible films, particularly such films in the form of a tubular bubble of plastic material.

It is another object to provide a new device that will have the same effect as an iris, or its linear equivalent, in stripping an air layer from the film surface while preventing physical contact between itself and the film.

The principle of the invention is also applicable to other types of film-handling devices, such as film guides, sizing frames, collapsing frames, and drying machines for drying webs (e.g. of paper), or for drying films of ink or glue on such webs, and it is another object to provide new devices of this type.

In accordance with the present invention there is provided a film-handling device for handling a thin flexible film of material moving in a predetermined direction in a movement path for the film, and for maintaining the said film in the path in predetermined spatial relation to the device, the device being for that purpose disposed closely adjacent to the said path, the device comprising:

first and second members having respective first and second front surfaces facing and spaced from a corresponding facing surface of a film passing in the said path, the first and second members forming between themselves a respective first air discharge orifice extending parallel to the said film facing surface transverse to its direction of movement and directing a corresponding first stream of air to contact the film facing surface and to pass between it and the said first front surface in the direction of motion of the film;

a third member having a respective third front surface facing and spaced from the said film facing surface, the second and third members forming between themselves a respective second air discharge orifice extending parallel to the said film facing surface and the said first orifice and directing a corresponding second stream of air to contact the film facing surface and to pass between it and the said third front face in the direction opposite to the direction of motion of the film;

the said second member front face being spaced further from the film facing surface than both of the said first and third member front surfaces, providing between the first and second orifices as the result of the oppositely directed first and second air streams a reduced pressure zone urging the film toward the second member front face for stabilization of the movement thereof; and means for supplying air under pressure to the said first and second orifices.

DESCRIPTION OF THE DRAWINGS

Film-handling devices that are particular preferred embodiments of the invention will now be described, by way of example, with reference to the accompanying diagrammatic drawings, wherein:

FIG. 1 is a plane transverse cross-section through a film-handling stabilizing device of the invention to show its operation with a thin plastics film, which can be of flat or tubular form;

FIG. 2 is a similar cross-section through another device of the invention in which provision is made for heating or cooling of the air employed;

FIG. 3 is a similar cross-section through another device of the invention in which provision is made for supply of additional cooling air to the film facing surface;

FIG. 9 is a plane cross-section to show the use of the device of the invention as a bubble collapsing frame.

DESCRIPTION OF THE PREFERRED EMBODIMENTS

Figure 4:
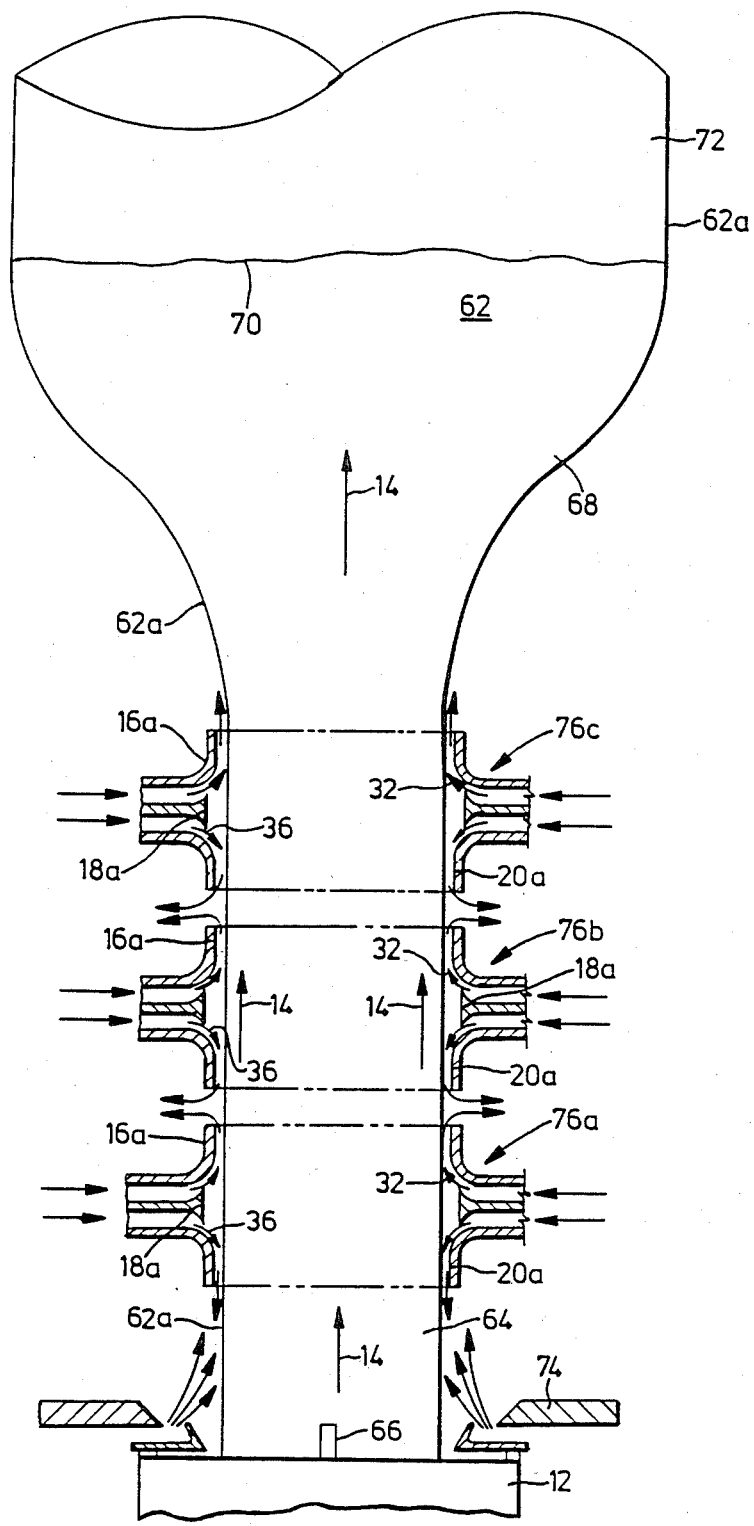
FIG. 4 is a transverse cross-section through a blown bubble of plastics material and showing the use of three of the devices of the invention, one above the other in the direction of movement of the bubble material, surrounding the unexpanded portion of the bubble "stack"

FIG. 1 shows a first embodiment of the invention applied to the stabilization of a sheet or film 10 which has been produced by extrusion from a die 12 fed with molten plastic material from an extruder which is not shown. The film may be extruded downward from an upper die, such a die being shown in solid lines, or alternatively upward from a lower die, such a die being shown in broken lines. The die orifice can be straight, whereupon the film 10 is flat, or it can be curved to any predetermined shape, including a complete circle, and in the latter case the film will take the form of a tube. For the purpose of this description, the upper die is operative and is linear; accordingly the extruded flat sheet moves vertically downward under gravity in the direction of the arrow 14.

The device consists of cooperating first, second and third members or portions 16, 18 and 20 respectively which extend parallel to one another, the second member 18 being interposed between the other two. Each of the three members has a respective front surface 16a, 18a and 20a spaced from and facing the immediately facing surface 10a of the film 10. The front surface 18a of the intermediate member 18 is always spaced a distance (a) from the film surface 10a that is greater than the distance (b) of the immediately adjacent portions of the two surfaces 16a and 20a, for reasons explained below. The two members 16 and 20 also have non-facing convex cross-section surfaces 16b and 20b respectively that have respective smooth linear junctions with the facing surfaces 16a and 20a at about respective lines 16c and 20c, these non-facing surfaces extending away from the film to eventually merge smoothly with the inside surfaces of two linear air ducts 22 and 24. The intermediate member 18 has two equivalent concave cross-section surfaces 18b which face portions of the convex cross-section surfaces 16b and 20b and join the front surface 18a at respective sharp acute-angled junctions 18c.

Pressurized air is supplied from a blower 26 to a plenum chamber 28 of the device and thence to the two ducts 22 and 24. The structures required to obtain smooth low- or non-turbulent flow of the air are known to those skilled in the art and need not be described in detail herein. The first and second members 16 and 18 form between themselves the respective junction 18c and the facing portion of the surface 16b an elongated (linear in this embodiment) orifice 30 parallel to the film 10 and transverse to its direction of movement, discharging a respective first stabilizing stream of air against the film facing surface 10a and so that the stream passes between the surfaces 10a and 16a in the direction of the arrow 32, which is eventually in the direction of motion of the film. Similarly, the second and third members 18 and 20 also form between themselves, between the respective junction 18c and the facing portion of the surface 20b an elongated orifice 34 parallel to the film 10 and transverse to its direction of movement, discharging a respective second stabilizing stream of air against the film facing surface 10a and so that this second stream passes between the surfaces 10a and 20a in the direction of the arrow 36, which is eventually directly opposite to the direction of motion of the film as it passes between those surfaces.

It will be noted also that the surfaces 16d and 20d of the respective members at their extreme tips are smooth extensions of the respective surfaces 16a and 20a and are of convex cross-section to increase the respective gaps 38 and 40 between them and the film 10 in the direction of flow of the respective air streams. This increasing gap enhances the well known venturi effect of the issuing air streams, creating a respective local low pressure or partial vacuum zone that urges the film toward the surfaces 16d and 20d and stabilizes the film relative to the device, without the possibility of the film contacting the device because of the intervening air streams.

The effect of these two oppositely directed vacuum creating streams is to produce between the surfaces 10a and 18a and the orifices 30 and 34 a central zone of lower pressure or effective partial vacuum that urges the respective portion of the film toward the surface 18a of intermediate member 18. The film 10 cannot contact the surfaces 16a and 20a because of the interposed air streams, and the distance (a) is made sufficiently greater than the distance (b) that it cannot contact the surface 18a, so that the portion of the film opposite the device is held firmly in position relative to the device to the extent that this portion at least of the film is stabilized in its path of travel and cannot oscillate and become unstable. The device will also act to hold the moving film firmly in its path against the displacing action of extraneous air currents, such as are encountered in industrial buildings. The volume of air required will be indicated by means of a specific example described below.

The device is illustrated for convenience as having orifices 30 and 34 which are of fixed dimension, but for particularly sensitive applications, for example, where they are used with molten or semi-molten materials, it may be required to construct the device so that the orifices can be adjusted, either individually or together, as to their flow volume and/or the angle at which the air streams are directed toward the film. The devices may be produced by extrusion from metal (e.g. aluminum) or a suitable plastic (e.g. nylon).

Devices of the invention inherently may provide some cooling of the film because of the two air streams impinging thereon, and this effect of the device can be modified by the embodiment illustrated in FIG. 2, the same reference numbers being used for similar parts wherever that is possible, and parts being omitted that have been illustrated sufficiently in FIG. 1. In this embodiment the first and third members 16 and 20 have the form of hollow enclosures in which heating or cooling fluids can be circulated in order to respectively heat or cool the respective air streams. Thus, the resulting plenum of the member 16 is illustrated as provided with an inlet 42 for the fluid circulating therein, while the plenum of the member 20 is illustrated as provided with an outlet 44.

The cooling of the air streams will of course enhance their cooling effect, while the heating will reduce it, and the heating can be sufficient that there is no cooling effect at all, with only the stabilizing effect remaining. Heating or cooling may also be employed in applications where the handling of the film not only involves its stabilization, but also its further processing, such as with a multi-layer film. The film 10 may be a paper web that must be dried and the device can replace the complex and expensive vacuum rollers that are commonly used for this purpose. As illustrated by FIG. 2, the film 10 may have a layer 46 of a solvent-carried glue or ink applied to the surface 10a from which the solvent must be evaporated for it to dry; such drying is facilitated if the impinging streams of air are heated. The device can therefore handle such films or webs which cannot be engaged by any mechanical device at all.

FIG. 3 illustrates a further embodiment of the invention consisting of a stabilizing device which also is able to provide additional cooling without requiring cooling of the stabilizing air streams, but instead by providing additional air streams which issue parallel to the stabilizing streams. Thus, in this embodiment the stabilizing device constituted by the members 16, 18 and 20 is enclosed in a further member 48 having its own air inlet 50. The further member has two wall members 52 and 54 which extend respectively parallel to the members 16 and 20. An edge 52a of the wall member 52 extends parallel to the rear face 16e of the member 16 so as to form between them a respective elongated air discharge orifice 56 parallel to the orifices 30 and 38 and discharging an additional air stream in the direction of travel of the sheet, as indicated by arrows 58, which engages the surface 10a of the sheet after it has been engaged by the air stream 32. Similarly edge 54a of wall member 54 extends parallel to the rear face of 20e of member 20, so as to form between them a respective elongated air discharge orifice 60 parallel to the orifices 34 and 40 and discharging an additional air stream in the direction opposite to that of the sheet (arrow 61), which contacts the surface 10a after it has been contacted by the air stream 36. The volume of each of the two stabilizing streams 32 and 36 will usually be from 5% to 20%, preferably about 10%, of that of these additional air streams.

FIG. 4 illustrates the application of devices of the invention to the production of thin plastic film by the blown process, in which the molten material is extruded from the die 12 in the form of an elongated tubular bubble 62, the outer surface 62a of which corresponds to the surface 10a of the sheet 10. The initial part 64 of the bubble stalk in its direction of movement is unexpanded despite the pressurized air that is fed to its interior via inlet 66, but as it cools progressively, at a certain point in the cooling process, it begins to expand under the effect of the internal air pressure forming a necked portion 68 and eventually, above the frost line 70 at which solidification takes place, a fully expanded portion 72. A primary cooling air ring 74 is provided as close as possible to the die outlet and discharges an annular stream of cooling air against the tube surface 62a. The initial part of the stalk is relatively long, as would be obtained, for example, with a high density linear polyethylene material and normally is difficult to keep stable, especially as the speed of travel is increased. The stalk is therefore provided with one or more (three in this embodiment) stabilizing devices 76a, 76b and 76c of the invention which are of ring configuration surrounding the bubble portion 64, all with the necessary small clearance so that the respective surfaces 16a, 18a and 20a are spaced their respective distances from the bubble surface 62a. The stalk is therefore firmly held at the three respective vertically spaced annular areas against transverse movements without the danger of mechanical contact between the film and the devices. Moreover, it will be seen that the downwardly moving annular air stream (arrows 86) from the lower stabilizing device 76a is in counterflow to the air from the primary ring 74, and will act to strip the warmed air from the ring 74 from the surface 62a, so that both of the air streams from the device 76a are more effective to provide incidental cooling of the material. The downwardly moving air stream of the device 76b will have the same stripping effect toward the upwardly moving stream from the device 76a, and so on for any further downstream devices such as the device 76c.

Figure 5:
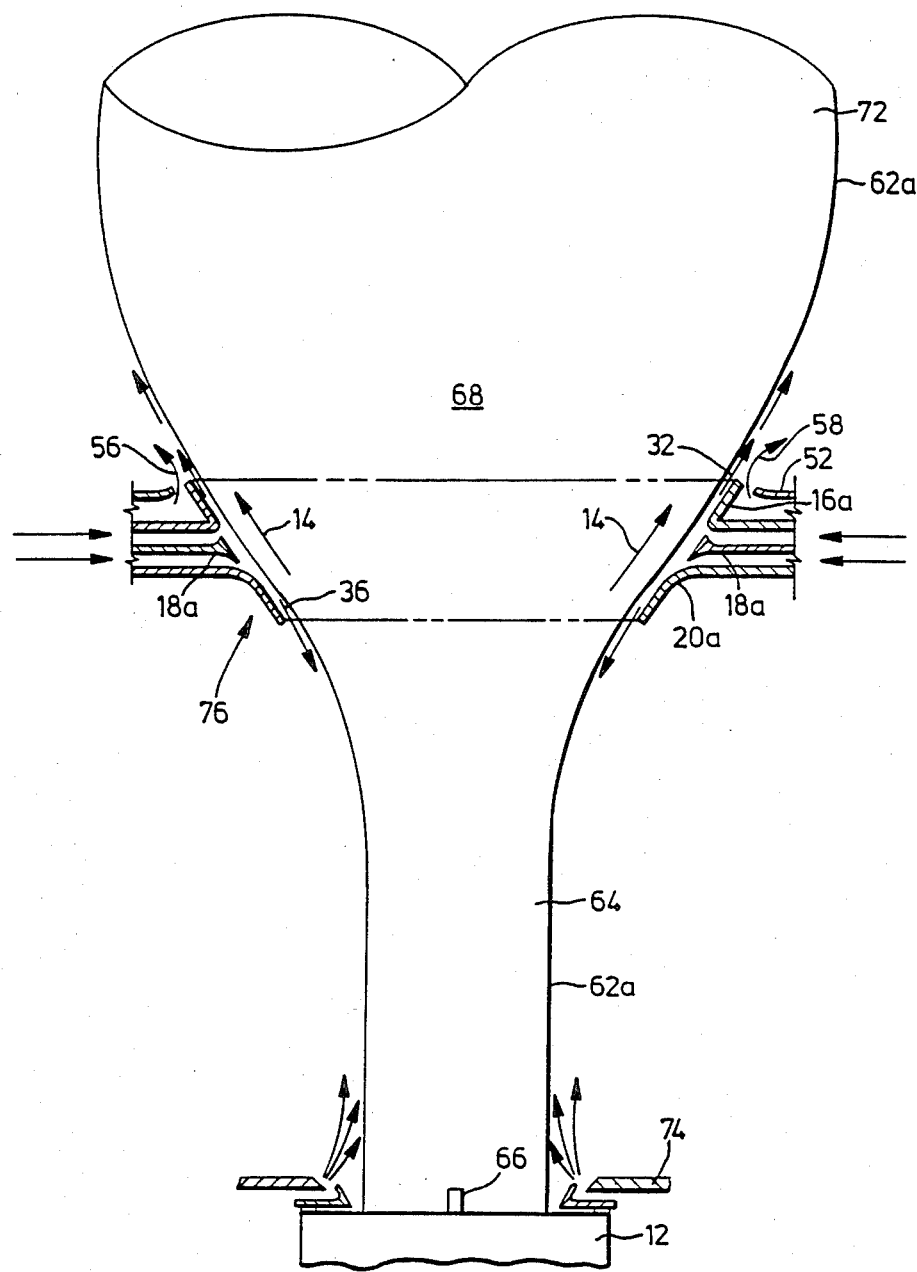
FIG. 5 is a transverse cross-section through a blown bubble to show the use of a device of the invention at the expansion zone of the bubble.

In the system of FIG. 5 a single device 76 is provided and this is designed for a specific blow-up ratio of the bubble at the expanding portion 68 between the unexpanded portion 64 and the expanded portion 72, so that the device will act to control the value of that ratio. Because of the expansion process that is taking place, this tends to be a relatively unstable part of the bubble stalk, and the placement of a single device at this location will give maximum stability for operation with a single device, despite the fact that the surfaces 16a, 18a and 20a must be of progressively increasing diameter to accommodate the expanding bubble. Since a single device is employed, it is also provided with means for delivering additional cooling air to the bubble surface, as with the embodiment of FIG. 3, such means including annular orifice 56 through which air flows in the direction of arrows 58 to produce a venturi effect. Owing to the configuration of the bubble at this location, it would not be effective to provide a downwardly moving supplementary air stream (arrow 61 in FIG. 3) along with the stream 36.

Figure 6:
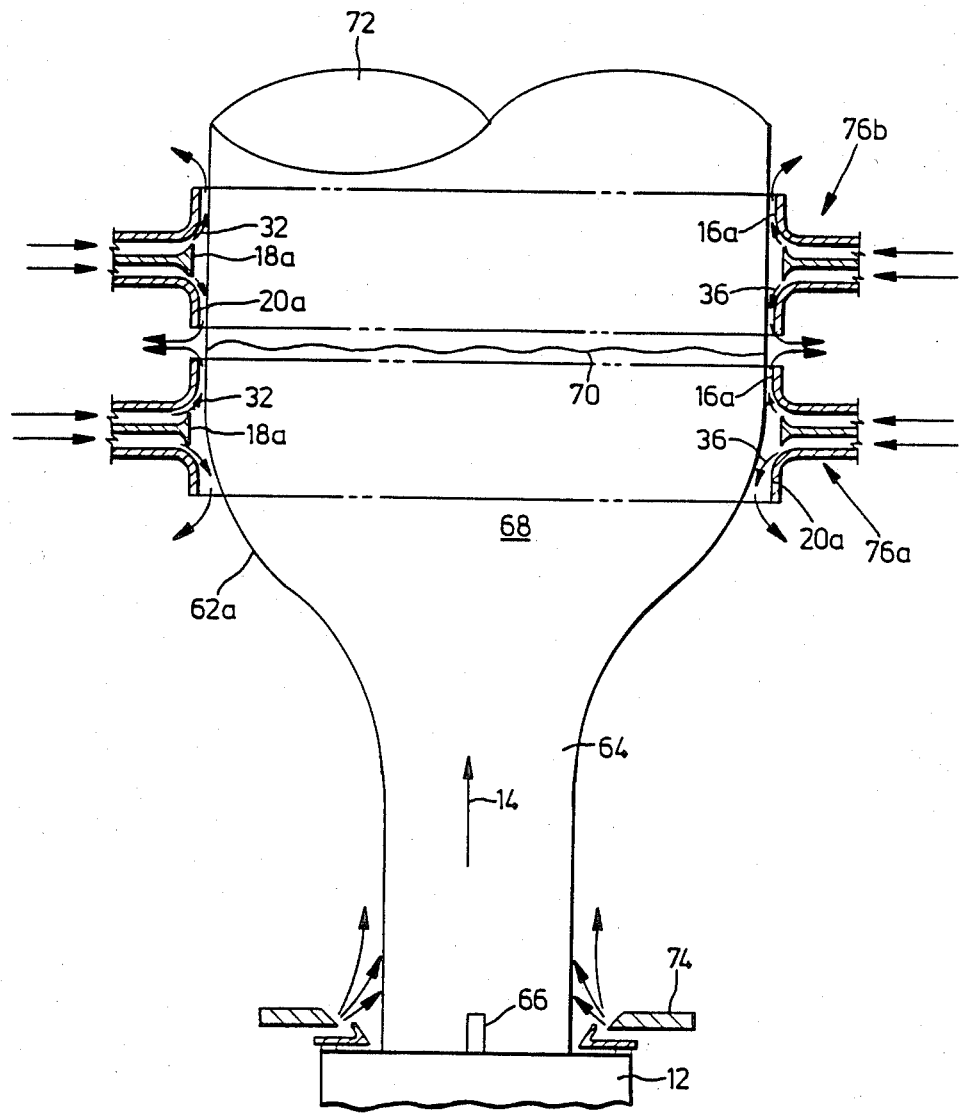
FIG. 6 is a similar transverse cross-section to FIGS. 4 and 5 to show the use of two devices of the invention, one located at the expansion zone below the frost line, and the other located surrounding the expanded portion of the bubble just above the frost line.

FIG. 6 illustrates a structure for use with a material which results in a relatively short, and therefore more stable, unexpanded stalk portion 64, so that the two devices 76a and 76b which are provided are of the same constant diameter and are disposed one above the other at the start of the fully expanded portion, the lower device 76a being below the frost line 70, while the upper device 76b is above it.

Figure 7:
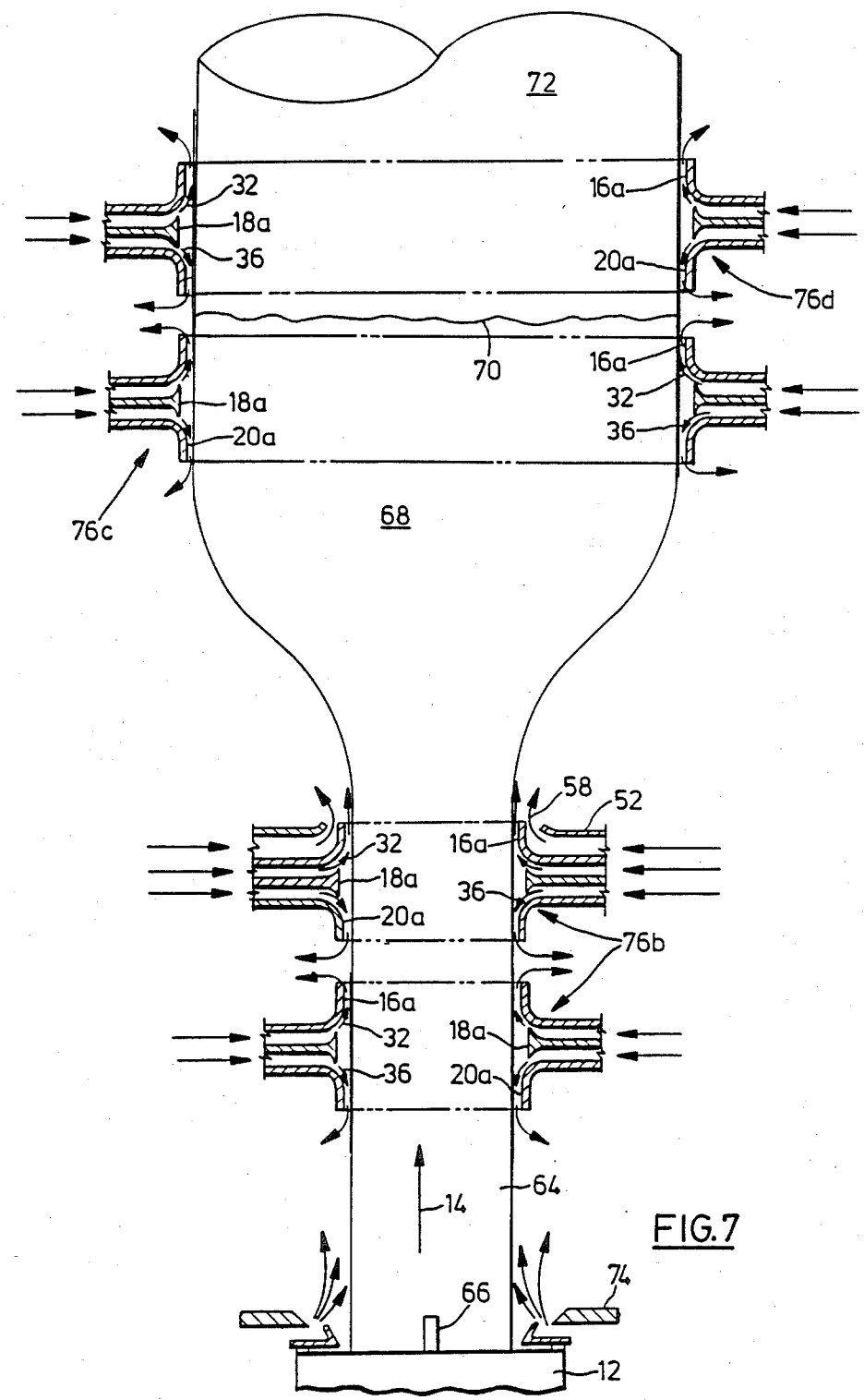
FIG. 7 is a similar view to FIGS. 4–6 to show the use of a plurality of the devices of the invention surrounding the unexpanded portion of the bubble, one of the rings being also a cooling ring, and another plurality surrounding the expanded portion of the bubble.

FIG. 7 shows an arrangement in which two devices 76a and 76b are employed surrounding the unexpanded portion 64, as with the structure of FIG. 4, while at the same time two further devices 76c and 76d of appropriate larger diameter are employed surrounding the expanded portion 72, as with the structure of FIG. 6. The device 76b closer to the expansion zone 68 is constructed to supply additional cooling air to the tube via annular orifice 58.

It will be noted that the devices of the invention not only stabilize the portion of the film to which they are applied, but also lock the film into a specific position relative to the device. Therefore, when the devices take the ring form illustrated by FIG. 4 onwards, they will stabilize and fix the diameter of the adjacent portion of the tubular bubble, and this effect has a number of potentially useful results. For example, the position of the frost line becomes less critical, since the device or devices around the unexpanded portion will hold this at a constant diameter, and similarly the device or devices around the expanded portion will hold it at a constant diameter. Again, it becomes possible to maintain blow-up ratios that might not otherwise be available with the combination of the die size and the internal pressurizing that is available with the installation; one practical effect is that different blow-up ratios may be available from the same size die that otherwise might have required the use of several different expensive dies. The devices of the invention are particularly suitable for application to the production of high clarity films, where any mechanical contact with the film will have an adverse effect.

One particular way of employing a device or devices of the invention is to mount it or them below the sizing cage that normally is employed, so as to be movable therewith, as described and claimed in our U.S. Pat. No. 4,479,766, issued Oct. 30, 1984, the disclosure of which is incorporated herein by this reference.

Figure 8:
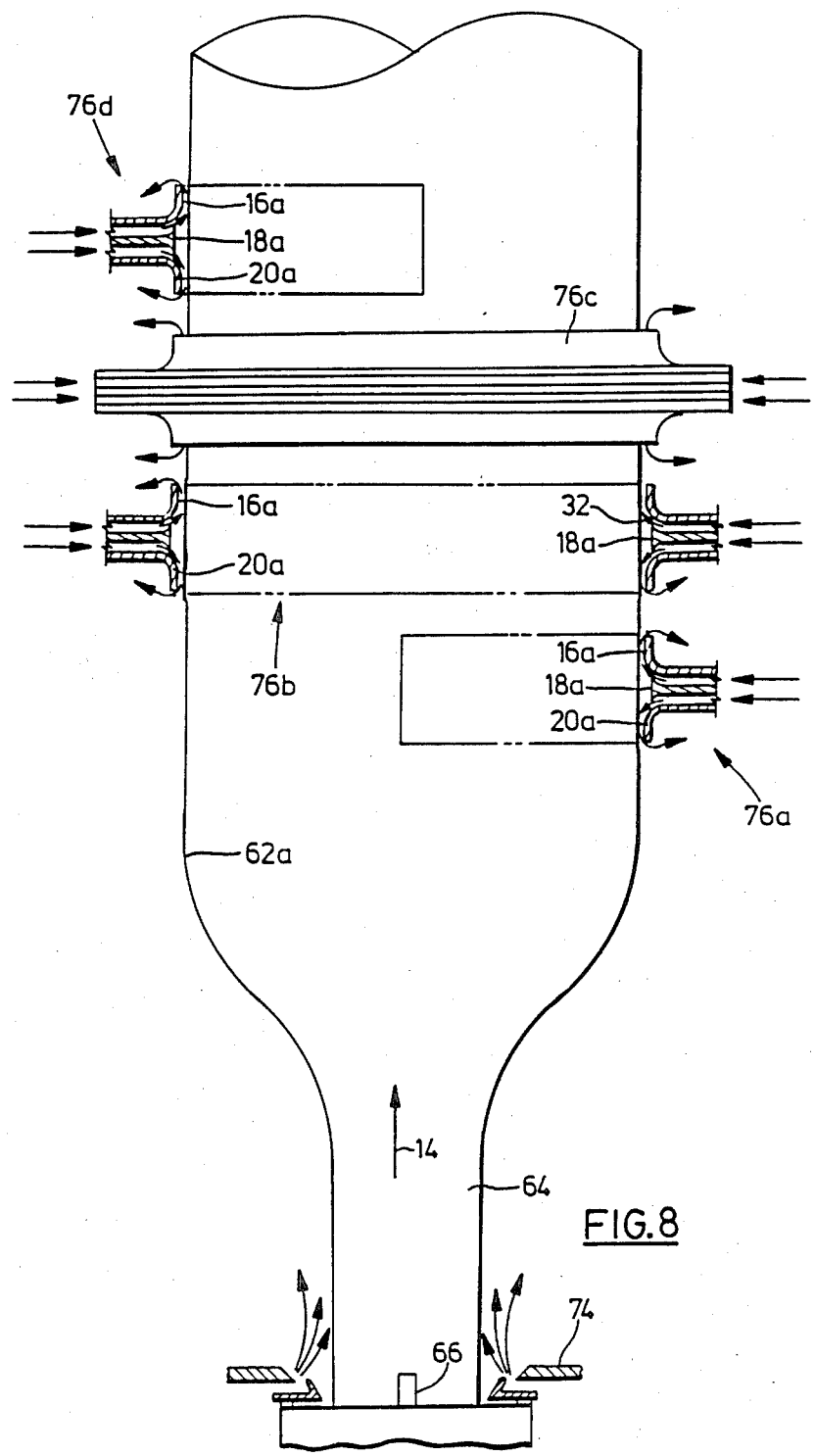
FIG. 8 is a similar view to FIGS. 4–7 to show the use of a plurality of the devices of the invention located one above the other and all surrounding the expanded portion of the bubble so as to constitute a variable diameter sizing cage for that part of the bubble.

FIG. 8 illustrates one structure in which the device of the invention can be employed in a sizing frame, such as is commonly employed to surround the expanded portion 72 of the bubble stalk, to ensure that it remains at a sufficiently constant diameter during the final cooling of the tube and before it is guided by a collapsing frame into the nip of the flattening rolls. A preferred structure for such a sizing cage is shown, for example, in our prior U.S. Pat. No. 4,388,061, issued Jun. 1983, the disclosure of which is incorporated herein by this reference. Such apparatus consists of a rigid rectangular frame (not shown) mounted for vertical movement so that its vertical position can be adjusted relative to the expanded portion of the bubble. In our prior structure, the frame mounts pairs of vertically spaced arms, each pair supporting between them a flexible support member carrying a plurality of rollers which contact the outer face of the bubble; the arms are moved toward and away from one another to adjust to the size of the bubble in the cage. In this embodiment the devices are therefore formed of flexible material so that they can be bent to the curvature that is most appropriate for the diameter of the bubble. Each device extends only over an arc of the circle, in this embodiment of about 200° and, as seen in FIG. 8, the first device 76a extends over this arc at the right of the bubble, the second device 76b extends behind the bubble, the third device 76c in front, and the fourth device 76d to the left of the bubble, so that between them the four devices encircle the bubble slightly more than twice. As the bubble wall 62a approaches any part of any of the devices it encounters the opposed discharging air streams and is held by the low pressure zone, but without touching the device, so that the sizing frame can operate with delicate films that might be damaged by physical contact with a mechanical device, such as a roller.

In such an embodiment the devices are made radially as thin as possible, and preferably are formed by extrusion from plastic material so as to be flexible. In this particular application, the orifices 30 and 34 can be small, requiring correspondingly low volumes of air that are easily supplied to the individual devices by small diameter flexible pipes. In many installations a cage of fixed diameter is employed, and such a structure is readily provided with arcuate or circular devices of fixed radius of curvature disposed as required along the path of the bubble.

FIG. 9 shows the employment of the device of the invention in a collapsing frame 78, which is disposed at the top end of the bubble to gather the tube progressively and smoothly into the nip of a pair of opposed parallel flattening rollers 80. This particular embodiment employs eight linear devices 76a through 76h arranged parallel to one another to form four opposed pairs 76a-76e, 76b-76f, 76c-76g and 76d-76h, the spacing between the pairs decreasing progressively the nearer to the rolls 80, the devices being inclined at the required angle to the vertical for the faces 16a, 18a and 20a to be parallel to the adjacent portion of the bubble. The devices will also need to increase in length as the bubble becomes progressively flattened, the devices 76b and 76f being longer than the devices 76a and 76e, and so on.

A device of the invention has been employed successfully on the experimental blown film line of the Applicant, which employs a 7.5 cm (3 inch) extruder feeding a 15 cm (6 inch) diameter extrusion die. The extruded material was high density polyethylene having a melt index (M.I.) of about 0.6, the line being run with a blow-up ratio of about 4:1, and resulting in a bubble stalk having a frost line about 1 meter (3 feet) from the die lips; the device was disposed about 50 cm (20 inches) from the die lips. The internal diameters of the surfaces 16a and 20a were the same in this embodiment and were 15.625 cm (6.25 inches), while the internal diameter of the surface 18a was 15.94 cm (6.375 inches). The length of the surfaces 16a and 20a were the same and were 2.5 cm (1 inch), while the length of the surface 18a was 1.25 cm (0.5 inch), the total height of the device being about 6.875 cm (2.75 inches). The two orifices 30 and 34 were of the same dimensions, so that the air supplied to the device would distribute itself approximately equally between them, subject perhaps to some diminution in the flow 36 against the direction of movement, and some enhancement of the flow 32 in the direction of movement, because of surface effects of the moving tube on the flows. The device performed satisfactorily when supplied with air at between pressures of from 5.0 cm to 7.5 cm (2 to 3 inches) of water and at flow rates of from 4,200 to 8,400 liters per minute (150 to 300 c.f.m.).

Although the invention has been specifically described in connection with the handling of thin webs of films or plastics material, particularly molten, semi-molten and the resulting solidified material, it will be apparent that the devices are equally applicable to the handling of flexible webs or films of other materials, such as paper, thin metals, cloths, etc.

I claim:

1. A film-handling device for handling a thin flexible film of material moving in a predetermined direction in a movement path for the film, and for maintaining the said film in the path in predetermined spatial relation to the device, the device being for that purpose disposed closely adjacent to the said path, the device comprising:

first and second members having respective first and second front surfaces facing and spaced from a corresponding facing surface of a film passing in the said path, the first and second members forming between themselves a respective first air discharge orifice extending parallel to the said film facing surface transverse to its direction of movement and directing a corresonding first stream of air to contact the film facing surface and to pass between it and the said first front surface in the direction of motion of the film;

a third member having a respective third front surface facing and spaced from the said film facing surface, the second and third members forming between themselves a respective second air discharge orifice extending parallel to the said film facing surface and the said first orifice and directing a corresponding second stream of air to contact the film facing surface and to pass between it and the said third front face in the direction opposite to the direction of motion of the film;

the said second member front face being spaced further from the film facing surface than both of the said first and third member front surfaces, providing between the first and second orifices as the result of the oppositely directed first and second air streams a reduced pressure zone urging the film toward the second member front face for stabilization of the movement thereof; and means for supplying air under pressure to the said first and second orifices.

2. A device as claimed in claim 1, and for use with a flat film, wherein the said first, second and third members, and the first and second orifices are all linear and parallel to one another.

3. A device as claimed in claim 1, and for use with a tubular film, wherein the said first, second and third members, and the first and second orifices are all circular and of a dimension to surround the tubular film and are parallel to one another.

4. A device as claimed in claim 1, wherein at least one of the said first and third members constitutes a wall of a compartment receiving fluid for heating or cooling the air of the respective stream of air.

5. A device as claimed in claim 1, and including a fourth member associated with one of the first and third members, the fourth member and the associated first or third member providing between them a respective air discharge orifice discharging an additional stream of air in contact with the film facing surface after it has been contacted by the respective first or second air stream.

6. A device as claimed in claim 1, and including fourth and fifth members associated respectively with the first and third members, the fourth member and the associated first member, and the fifth member and the associated second member providing between them respective air discharge orifices discharging respective additional streams of air in contact with the film facing surface after it has been contacted respectively by the first and second air streams.

7. A device as claimed in claim 1, wherein the film surface is tubular and the first, second and third members provide respective front surfaces that are circular and of respectively progressively increasing diameter in the direction of movement of the film to accommodate corresponding increase in diameter of the tubular film surface.

8. A device as claimed in claim 1, and comprising the film-handling members of a bubble sizing frame, the frame comprising a plurality of devices which are flexible along their length for adjustment of their curvature, and means mounting the devices to adjust their curvature to the bubble diameter.

9. A device as claimed in claim 1, and comprising the film-handling member of a bubble collapsing frame, the frame comprising a plurality of linear devices disposed parallel to one another on opposite sides of the path of movement of the bubble, the spacing between the devices decreasing progressively in the direction of movement of the bubble between the members to progressively collapse it.

10. A film-handling device for use in a system for the production of a thin flexible film of extruded plastic material moving in a predetermined direction in a movement path downstream of a die from which the said film is extruded, the device maintaining the said film in predetermined spatial relation to the device and for that purpose being disposed closely adjacent to the path downstream of the die, the device comprising:

first and second members having respective first and second front surfaces facing and spaced from a corresponding facing surface of a film passing in the said path, the first and second members forming between themselves a respective first air discharge orifice extending parallel to the said film facing surface transverse to its direction of movement and directing a corresponding first stream of air to contact the film facing surfce and to pass beteen it and the said first front surface in the direction of motion of the film;

a third member having a respective third front surface facing and spaced from the said film facing surface, the second and third members forming between themselves a respective second air discharge orifice extending parallel to the said film facing surface and the said first orifice and directing a corresponding second stream of air to contact the film facing surface and to pass between it and the said third front face in the direction opposite to the direction of motion of the film;

the said second member front face being spaced further from the film facing surface than both of the said first and third member front surfaces, providing between the first and second orifices as the result of the oppositely directed first and second air streams a reduced pressure zone urging the film toward the second member front face for stabilization of the movement thereof; and means for supplying air under pressure to the said first and second orifices.

11. A device as claimed in claim 10, and for use with a flat film, wherein the said first, second and third members, and the first and second orifices are all linear and parallel to one another.

12. A device as claimed in claim 10, and for use with a tubular film, wherein the said first, second and third members, and the first and second orifices are all circular and of a dimension to surround the tubular film and are parallel to one another.

13. A device as claimed in claim 10, wherein at least one of the said first and third members constitutes a wall of a compartment receiving fluid for heating or cooling the air of the respective stream of air.

14. A device as claimed in claim 10, and including a fourth member asociated with one of the first and third members, the fourth member and the associated first or third member providing between them a respective air discharge orifice discharging an additional stream of air in contact with the film facing surface after it has been contacted by the respective first or second air stream.

15. A device as claimed in claim 10, and including fourth and fifth members associated respectively with the first and third members, the fourth member and the associated first member, and the fifth member and the associated second member providing between them respective air discharge orifices discharging respective additional streams of air in contact with the film facing surface after it has been contacted respectively by the first and second air streams.

16. A device as claimed in claim 10, wherein the film surface is tubular and the first, second and third members provide respective front surfaces that are circular and of respectively progressively increasing diameter in the direction of movement of the film to accommodate corresponding increase in diameter of the tubular film surface.

17. A device as claimed in claim 10, and comprising the film-handling members of a bubble sizing frame, the frame comprising a plurality of devices which are flexible along their length for adjusting of their curvature, and means mounting the devices to adjust their curvature to the bubble diameter.

18. A device as claimed in claim 10, and comprising the film-handling member of a bubble collapsing frame, the frame comprising a plurality of linear devices dispsed parallel to one another on opposite sides of the path of movement of the bubble, the spacing between the devices decreasing progressively in the direction of movement of the buble between the members to progressively collapse it.

* * * * *